C. WILLIAMSON.
APPARATUS FOR RAISING SUNKEN VESSELS.
APPLICATION FILED JULY 14, 1909. RENEWED APR. 11, 1911.
1,009,123.
Patented Nov. 21, 1911.
5 SHEETS—SHEET 2.
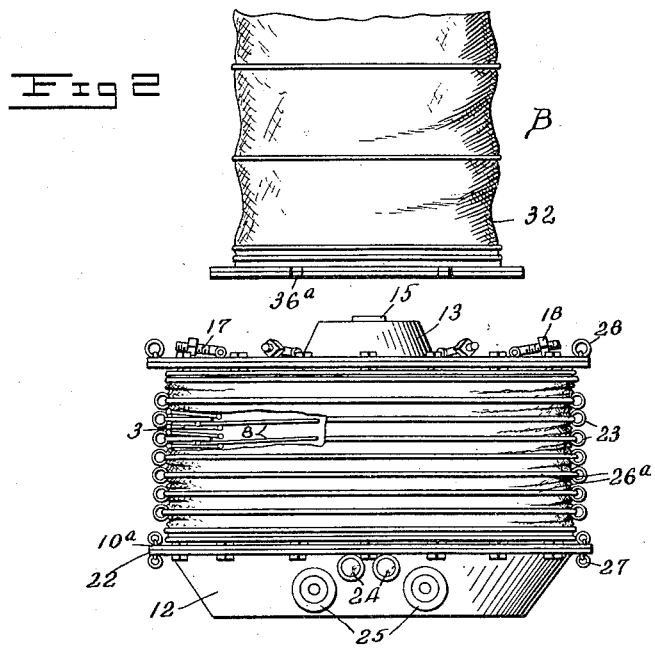
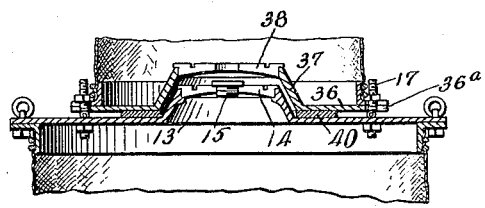
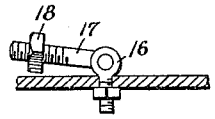
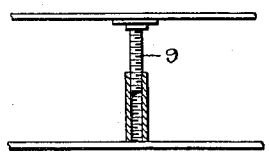
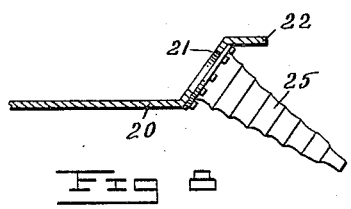
Inventor
Charles Williamson
Witnesses
By Meyers, Cushman & Rea
Attorney C. WILLIAMSON.
APPARATUS FOR RAISING SUNKEN VESSELS.
APPLICATION FILED JULY 14, 1909. RENEWED APR. 11, 1911.
1,009,123.
Patented Nov. 21, 1911.
5 SHEETS—SHEET 3.
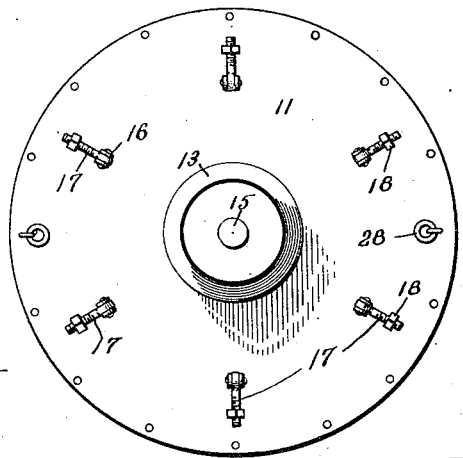
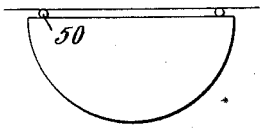
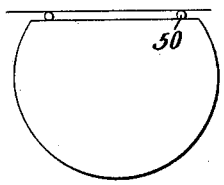
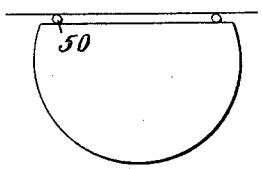
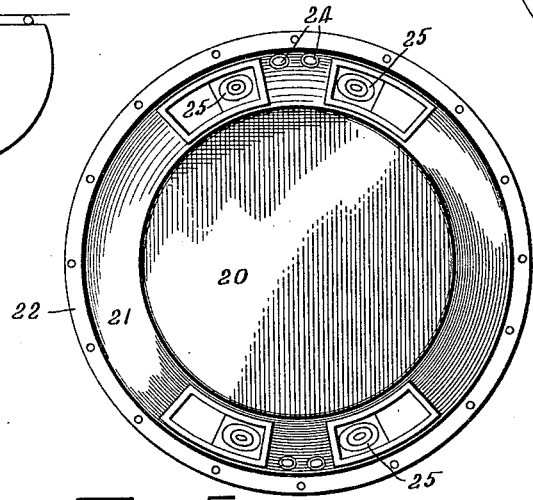
Inventor
Charles Williamson
Witnesses
By Meyers, Cushman & Rea
Attorney

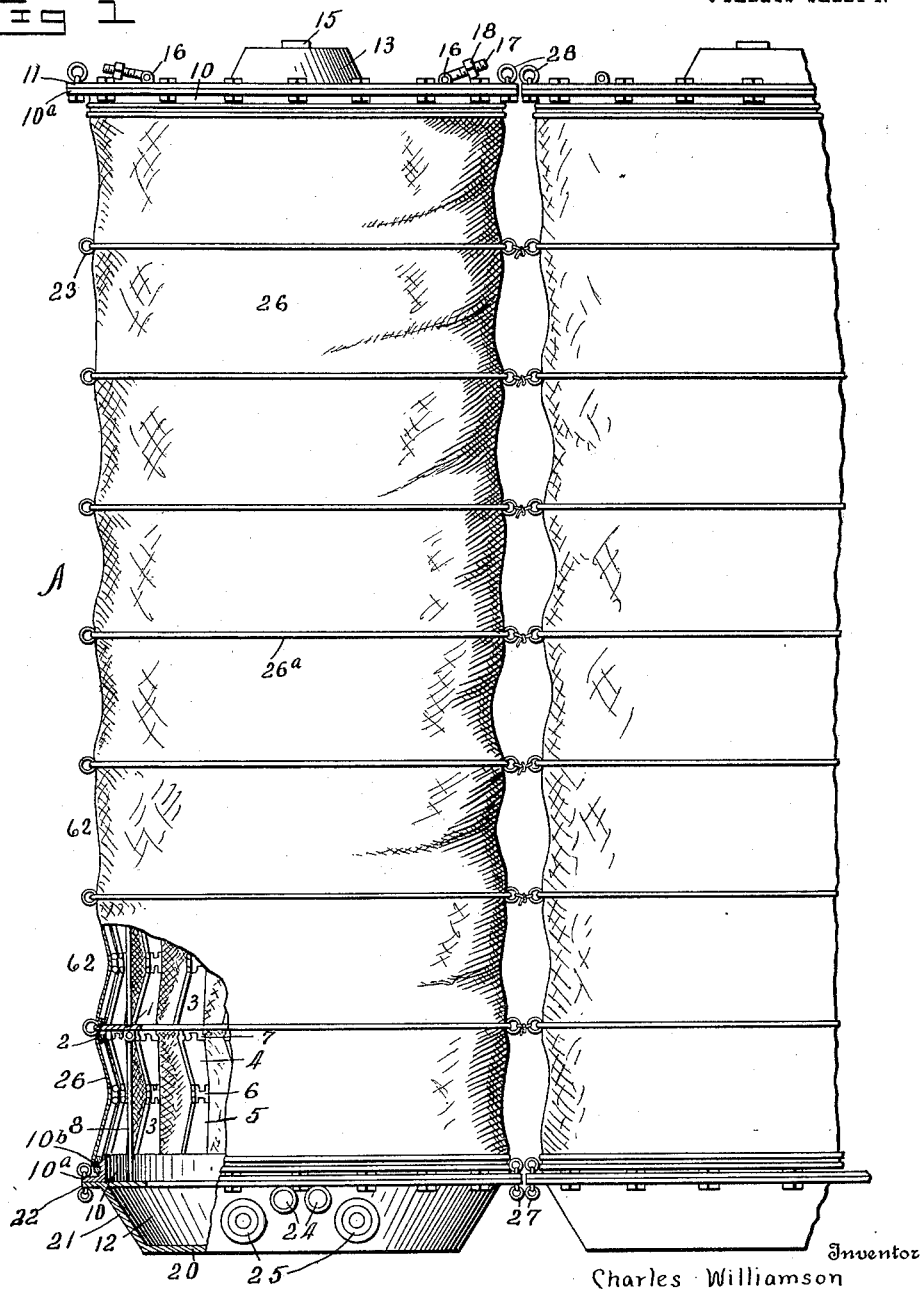

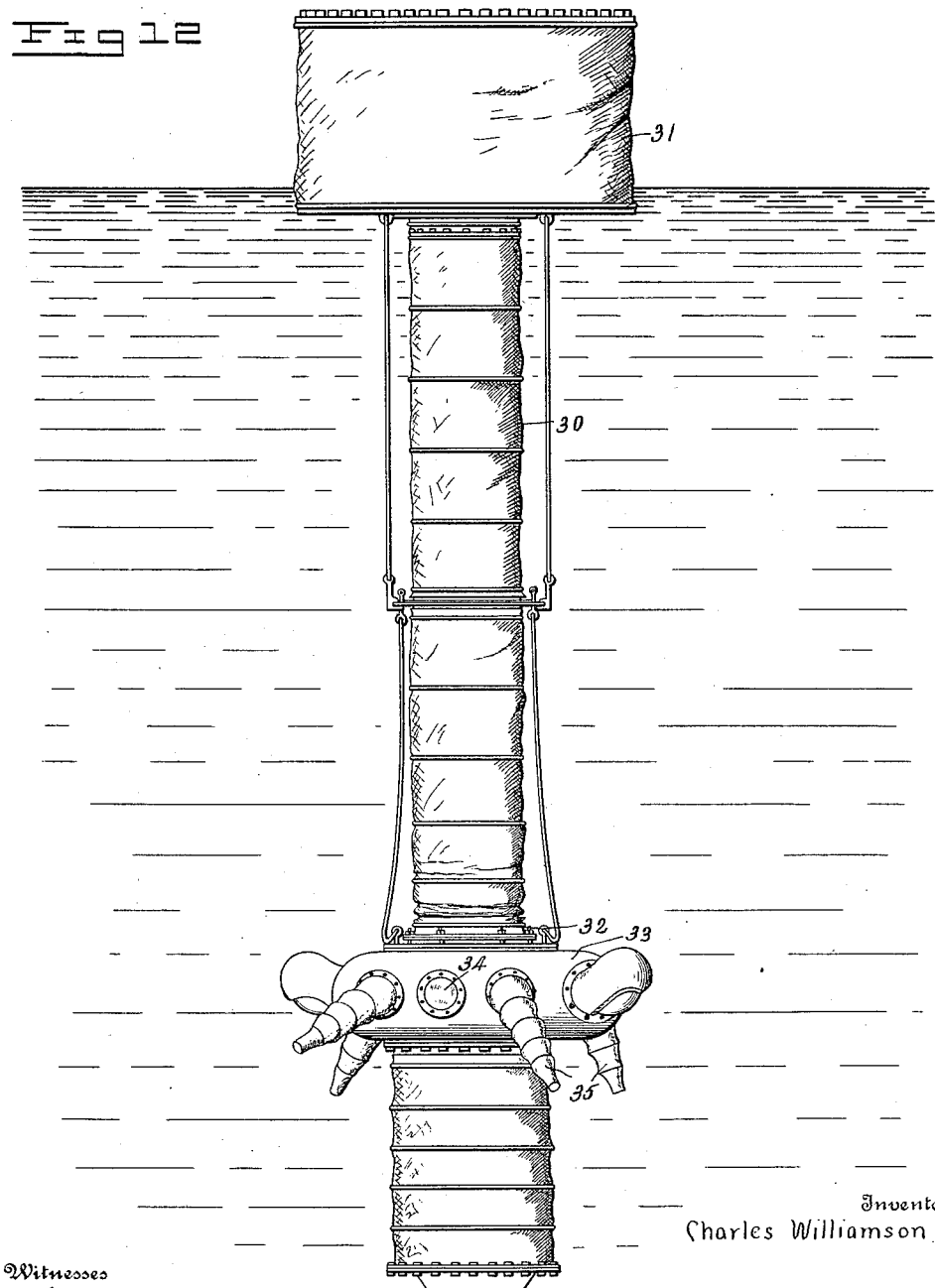

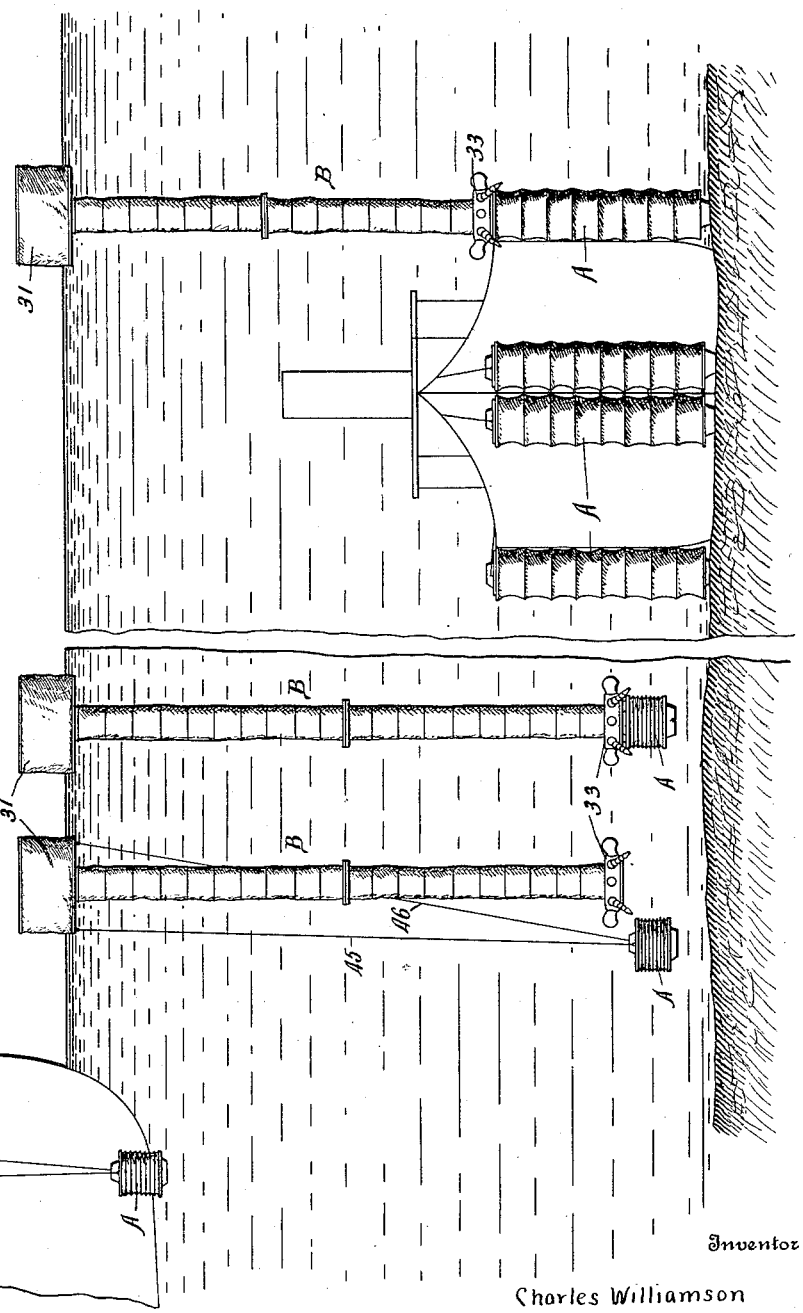

UNITED STATES PATENT OFFICE.

CHARLES WILLIAMSON, OF NORFOLK, VIRGINIA.

APPARATUS FOR RAISING SUNKEN VESSELS.

1,009,123.  Specification of Letters Patent.  Patented Nov. 21, 1911.

Application filed July 14, 1909, Serial No. 507,573. Renewed April 11, 1911. Serial No. 620,370.

*To all whom it may concern:*

Be it known that I, CHARLES WILLIAMSON, a citizen of the United States, residing at Norfolk, in the county of Norfolk and State of Virginia, have invented new and useful Improvements in Apparatus for Raising Sunken Vessels, of which the following is a specification.

This invention relates to an apparatus designed mainly for wrecking purposes, but may also be used with equal facility in other submarine work where large and heavy objects are to be carried from one place to another without bringing them to the surface of the water.

To this end the invention comprises a collapsible pontoon of novel construction and made in any suitable size, a number of which are to be fastened to a vessel or other object to be raised, or partly raised, and floated to its destination. The number of pontoons employed for the purpose will naturally depend upon the weight of the object to be lifted, and the lifting capacity of each pontoon.

If a vessel is to be raised and brought to port, a suitable number of these novel pontoons in a collapsed condition and submerged will be towed from the wrecking vessel and distributed along the hull of the wreck on both sides thereof from bow to stern, after which the pontoons are expanded or extended and securely fastened to the wreck and to one another.

The pontoons in their collapsed condition and securely lashed to prevent expansion are thrown into the water from the wrecking vessel where they slowly sink, as the weight of each pontoon when collapsed is slightly greater than the water displaced. One or more lines or ropes are fastened to each pontoon to prevent it being lost.

The pontoons may be towed to the wreck by any convenient means, but for this purpose it is deemed best to employ the apparatus or floating caisson described and claimed in Patent No. 745,469, granted to me on the first day of December, 1903. This apparatus is adapted to be separately connected to the top of a pontoon and supports it while said apparatus is towed to the wreck, and holds the pontoon in any position desired until firmly fastened in place, after which the apparatus or floating caisson is disconnected from the pontoon and returned to the wrecking vessel for another. During the time the apparatus and pontoon are connected, communication is established between the two, so that wreckers may pass into the pontoon from the caisson to expand the former and cause it to fill with air from the latter which, it will be understood projects above the surface of the water.

With the above and other objects in view to be described later, the invention consists of the novel construction, combination and arrangements of parts hereinafter described and pointed out in the claims, reference being had to the accompanying drawings, in which—

Figure 1 is an elevation, partly in section, of a fully extended pontoon and a portion of a second pontoon showing how they are lashed together; Fig. 2, a like view of a collapsed pontoon and a portion of the floating caisson before being connected together; Fig. 3, a central, vertical sectional view through adjoining portions of the pontoon and caisson showing them fastened together by a water tight connection, also the means of communication from one to the other; Fig. 4, a top plan view of the pontoon; Fig. 5, a like view of the bottom section of the pontoon; Fig. 6, a detail view, enlarged, of one of the fastenings for connecting the pontoon to the floating caisson; Fig. 7, a detail view, enlarged, of a modified form of one of the props for holding the pontoon distended; Fig. 8, a sectional view, through the lower section of the pontoon, showing one of the flexible sleeves for a wrecker's arm; Figs. 9, 10 and 11 are diagrammatic plan views of three modified forms of the pontoon; Fig. 12, an elevation of the floating caisson, and Fig. 13, a general view illustrating the manner of using the apparatus.

Similar reference characters are used for the same parts in all the figures.

In the accompanying drawings, A indicates the pontoon as a whole, comprising a number of rigid supporting rings 1 preferably made of thin metal and provided on their outer edges with preferably curved flanges 2 which project beyond each face of said ring. These rings are assembled one above another, and are connected together by radially folding links 3, each preferably made in three parts, an upper, a lower and an intermediate member 4, 5 and 6 respectively, pivoted together, the opposite ends of the upper and lower members 4 and 5 being also pivotally connected to suitable hinge lugs 7 integral with or rigidly secured on the flanges 2 of the supporting rings 1. The length of the upper and lower link members will depend upon the distance which separates the rings 1, when the pontoon is extended, a distance to be determined by circumstances or other considerations. The links 3 are relatively wide and are placed close together to form a strong supporting wall for the pontoon, the upper and lower members 4 and 5 tapering slightly on each edge toward the intermediate members 6 thus enabling links to readily fold inwardly when the pontoon is collapsed.

The top and bottom rings 10 of the pontoon are alike and differ from the intermediate rings, in that they are much wider and each is provided with an exterior longitudinal flange $10^a$ projecting outwardly therefrom for the purpose of fastening said rings to the top plate 11 and bottom section 12 of the pontoon. The outer surfaces of these rings are provided with horizontal grooves $10^b$ for a purpose to be hereinafter described.

Surrounding the supporting rings 1 and 10 of the pontoon A and their connecting links 3 is a flexible waterproof tube or casing 26 firmly fastened to the rings by bands or wires $26^a$ passing around said rings outside of the tube or casing and pressing the latter tightly against the curved flanges of the supporting rings 1 and into the horizontal grooves $10^b$ of the upper and lower rings 10. As the ends of the waterproof tube or section 26 are connected to the upper and lower rings 10, these fastenings must be made water-tight which may be done in any approved manner. When the pontoon is in the water and expanded the pressure of the water against the flexible casing would tend to force it inwardly were it not for the strong supporting wall formed by the rings 1 and the flexible folding links 3 which effectually prevent the pontoon from collapsing under the heavy external pressure.

The pontoon A is closed at the top by a flat cover plate 11 bolted or riveted, as previously described, to the flange $10^a$ of the upper ring 10, in the center of which cover plate is an upwardly projecting dome 13 open at the top for a door or closure 14 screwed or otherwise removably fastened thereto in an air tight manner. A threaded opening having a closure 15 may be formed in the door 14 for the attachment of an air pipe should it become necessary to force air into the pontoon. The door or closure 14 is made of sufficient size for the passage of a man into the pontoon for the purpose of expanding the same and to perform other work that may be required.

Rigidly fastened to the top plate 10 of the pontoon between the dome and its outer edge are a number of equally spaced hinge blocks 16, to each of which blocks is pivoted a locking bolt 17 threaded on its outer end for a securing nut 18. These bolts are used for fastening the pontoon to a floating caisson B, that transports said pontoon wherever required; a more detailed description of this apparatus will be presented later.

The bottom of the pontoon A is closed by a rigid section or work chamber 12 having a flat bottom 20, outwardly flaring side walls 21 and a flat horizontal rim or flange 22 projecting outwardly from the top of said walls and bolted to the horizontal flange $10^a$ of the bottom ring 10 of the pontoon. A series of suitable sight glasses 24 are set into the side walls of the bottom section 12, and in addition to these sight glasses, there are on opposite sides of the sight glasses and fastened to the walls thereof, a pair of water tight flexible folding sleeves 25 which project outwardly from the pontoon and into which the arms of two wreckers may be slipped, and by this means they are enabled to operate outside of and at the bottom of the pontoon. Between each pair of sleeves 25 the sight openings or glasses are placed for the convenience of the men whose arms are in the sleeves. The section 12 may be fitted with other gear or equipment.

To hold each section of the pontoon in extended position a series of props 8 are pivoted on the under side of the upper ring of each section and rest on the lower ring when the sections are opened to their greatest extent. When the sections are to be folded, the props must be disengaged at their bottom ends so that they can swing in radial position by adjacent links.

As an adjunct to, or in place of the hinged props 8 for holding the supporting rings apart, removable props 9 may be employed. Each of these props is made in two parts one threaded into the other so that it can be increased or decreased in lengths. When not in use the upper section will be screwed into the lower one, but when the props are to be put in use, the sections are turned in order to unscrew one from the other a sufficient distance to be extended between the supporting rings and be forced tightly against them.

Fastened to the sides of the pontoon in line with each supporting ring at suitable distances apart are small rings 23 fastened to the pontoon by any suitable means, but here shown as being secured by the bands or wires $26^a$ which fasten the covering 26 in place. These rings are used for lashing adjacent pontoons together. Other rings 27 fastened to the flange of the lower section of the pontoon are used for connecting the bottoms of the pontoons on one side of a wreck to those on the other side, the fastening ropes or cables passing beneath the keel of the wreck, while at the top of the pontoon are rings 28 for fastening ropes which pass therefrom over the deck of the wreck and secure the pontoons firmly against the sides thereof.

The pontoons A are preferably attached, for the purpose of transportation, to a floating caisson B such as shown in Fig. 12. This caisson comprises a tubular collapsible section 30 having a collapsible section 31 which floats upon the surface of the water and which communicates through the tubular section 30 with a working section 32 at the bottom thereof. This working section may be made to extend any distance below the surface of a body of water by increasing or decreasing the length of the tubular section 30. Near the lower end of the working section 32 is a noncollapsible turret 33 having outwardly projecting helmets, glazed sight openings 34 and flexible waterproof sleeves 35 projecting outwardly from said turret. The turret is preferably of larger diameter than the casing proper so as to give increased range of vision and greater freedom to the workmen. The bottom of the caisson is made of a plate 36 having a dome 37 projecting upwardly in its center and provided with an opening, closed by a door or cover 38. The edge of the plate 36 is provided with a series of spaced notches 36ª equal in number to the locking bolts 17 hinged on the top plate of a pontoon, and when the pontoon is to be attached to the caisson it is brought beneath the latter, or the caisson floated over the pontoon until they are in axial line with each other. They are then brought together by lifting the pontoon by means of the lines or ropes 45 and 46 attached to the rings 27 and leading into the floating section 31 of the caisson B. The top of the pontoon A is thus brought into contact with the bottom of the caisson B and the dome 13 of the pontoon enters the dome 37 of the caisson until their respective doors are in close relation to each other. Operators now enter the working chamber of the caisson and passing their arms through the flexible sleeves grasp the fastening bolts on the top of the pontoon, and swinging said bolts 17 into the slots or notches 36ª in the bottom plate 36 of the caisson, the nuts 18 thereon are screwed firmly against the plate thereby forcing the contacting plates of the pontoon and caisson into close relation with each other or against a packing strip 40 placed between them, so that the connection between the two will be water-tight. The closures 14 and 38 may now be removed from the two domes 13 and 37 thus establishing communication between the caisson and the pontoon so that the wreckers may enter the latter for the purpose of expanding the same to allow air to flow thereinto and fill said pontoon when fully expanded, after which the closures will be once more fastened in place and the pontoon becomes an independent floating body with great lifting power.

The pontoons A are preferably made cylindrical, but at times and for certain uses this shape will not be convenient. Pontoons of the several shapes shown in Figs. 9, 10 and 11 and of other forms will probably be made for use under varying conditions. Between the pontoons and the side of the vessel to be raised cushions 50 of any suitable material, such as India rubber tubing, rope, etc., may be employed.

The pontoon, and also the floating caisson, are held in upright position in the water by the weight of their collapsible walls and the relatively heavy metal structure on the bottom of the caisson and pontoon. When working in very deep water ballast may be carried if found necessary.

In using this apparatus for the purpose of raising vessels, a sufficient number of pontoons A are carried to the wreck besides a number of floating caissons B and other necessary material. The first operation after anchoring the wrecking vessel near the ship to be raised will be to put two or more floating caissons B in the water and the pontoons ready to be thrown overboard. This consists in setting up and collapsing the pontoons if they should be disconnected and securely fastening them against expansion until such time as they are required. The pontoons, after attaching ropes to the rings 27 on the top thereof, are thrown into the water where they gradually sink to the bottom owing to their slightly greater specific gravity. The pontoons are held by the ropes 45 and 46 to prevent them from floating away. A caisson is now brought close to the vessel and the ropes 45 and 46 of a pontoon are passed therefrom to men in the floating section of the caisson who manipulate the pontoon until it is brought beneath the caisson. The pontoon is then drawn upwardly against said bottom of the caisson and the ropes fastened to the floating section. The men then enter the caisson and into the working chamber and after passing their arms through the sleeves 35 fasten the pontoon to the caisson by the swinging bolts heretofore mentioned and cast off the lines 45 and 46. The caisson is now towed to the wreck and the upper end of the pontoon fastened thereto in any suitable position about the vessel. The workmen now remove the closures between the caisson and the pontoon and enter the latter, gradually expanding the same by means of suitable tackle. After expanding each section of the pontoon the props are lowered into places to keep the supporting rings apart so that the whole structure will be firm and rigid and able to withstand heavy external pressure. After expanding the pontoon it is lashed to an adjacent one and to the pontoons on the opposite side of the wreck by passing ropes or cables over the deck and beneath the keel of the wreck and securing them to small rings 27 and 28. As the pontoons expand, air enters the manholes filling the pontoons, which air is retained therein after the men leave by closing the opening leading thereinto. The pontoons having been secured to the wreck, the caisson is disconnected, after closing the opening of the dome 37, by loosening nuts of the swinging bolts and turning the latter outwardly so as to disengage them from the slots in the bottom plate 36. The disconnected caisson B will now be towed back to the wrecking vessel for another pontoon and the operation hereinabove described repeated until a sufficient number of pontoons have been attached to the wreck to float it. The number of caissons used will depend upon the size of the crew of the wrecking vessel. With a small crew from two to four caissons will be sufficient for passing to and from the wreck to carry the pontoons and return for new ones.

From the above it will be readily understood that a collapsible pontoon made of a plurality of sections, each section comprising an upper and a lower supporting ring and inwardly folding connecting links pivoted thereto, and surrounded by a suitable flexible waterproof casing will form a strong tight structure which when expanded will be capable of lifting comparatively heavy weights, and when collapsed can be conveniently stored as they occupy but little space.

What I claim is,—

1. The combination with a floating caisson provided with exterior fastening means, of a collapsible pontoon having complemental fastening means on one end for detachably securing said pontoon to the caisson, and means on the caisson whereby said fastening devices may be connected and disconnected from within the caisson.

2. In combination with a collapsible floating caisson, of a collapsible pontoon, and fastening means on the outside of both caisson and pontoon adapted to be operated from within said caisson to connect the pontoon thereto and disconnect the same.

3. In combination with a collapsible floating caisson, of a collapsible pontoon adapted to be separably attached to the bottom of said caisson in an axial line, and a removable fluid tight closure on the contacting end of both caisson and pontoon to permit intercommunication between said parts when connected.

4. In combination with a collapsible floating caisson, of a collapsible pontoon adapted to be separably attached to the bottom of the caisson, a dome on the contacting surface of the caisson and the pontoon fitting one within the other, and a water tight removable closure for each dome to permit intercommunication between the caisson and the pontoon when connected.

5. In combination with a floating caisson, of a collapsible pontoon adapted when collapsed to sink, a flat top to said pontoon provided with a manhole, and a closure for the same, pivoted fastening devices on said top for removably fastening the pontoon watertight to the bottom of the caisson from within the caisson, and means within the caisson provided with a closure adapted to register with the manhole in the pontoon when the latter is removably fastened in place, whereby entrance may be had into the pontoon from the caisson.

6. A floating caisson having a working chamber at its lower end and means for enabling workmen in said chamber operating outside the same, combined with a collapsible pontoon adapted to be secured to the bottom of said caisson, and fastening devices on the exterior of said pontoon and caisson arranged to be connected and disconnected from within said caisson.

7. A collapsible pontoon comprising a plurality of parallel rings, folding links connecting said rings one to another, a flexible waterproof tube inclosing said links, a top having a man-hole opening therethrough and a removable closure therefor, a closed bottom for the pontoon, and props adapted to be placed between said rings when separated to prevent the pontoon collapsing.

8. A collapsible pontoon comprising a plurality of parallel rings, folding links connecting said rings one to another, a flexible waterproof tube inclosing said links and rings, a top plate and a bottom section fastened respectively to a lateral flange on the upper and lower ring, fastening devices on the upper plate, and means on the upper plate for giving admission into the pontoon.

9. A collapsible pontoon adapted when collapsed to sink below the surface of a body of water, fastening means on one end of said pontoon for attaching the same when submerged to a floating structure having exterior securing means, other fastening means on said pontoon for attaching the same to an object to be raised, a man-hole on the same end of the pontoon as the first mentioned fastening devices to permit entrance into the pontoon, and a closure for said man-hole.

10. A collapsible pontoon, adapted when collapsed to sink below the surface of a body of water, means for attaching said pontoon to and detaching it from a floating structure while submerged, means for opening communication between said floating structure and the pontoon to permit expansion of and free entrance of workmen and air into the pontoon, and means for securing said pontoon from within the same and the floating structure to an object to be floated.

11. A pontoon comprising a top plate, a closed rigid bottom having a depressed portion with side walls provided with sight glasses and outwardly projecting sleeves, a collapsible section between the top and bottom members, and a man-hole through the top plate and provided with a closure.

12. A pontoon comprising a top plate, a closed bottom, a collapsible wall section connected to the top and bottom members, and props suitably hinged at their upper ends and adapted to be operated automatically by means of the collapsible wall sections to hold the pontoon while in expanded position from collapsing.

13. A pontoon having a rigid top and bottom plate and collapsible sides, exterior fastening means on said top plate for temporarily connecting the pontoon fluid-tight to a floating transporting means, a man-hole in said top-plate adapted to register with a similar man-hole in the floating transporting means, and a closure for each man-hole.

In testimony whereof I have hereunto set my hand in presence of two subscribing witnesses.

CHARLES WILLIAMSON.

Witnesses:
 LEO JUDSON,
 J. S. OAKES.

---

Copies of this patent may be obtained for five cents each, by addressing the "Commissioner of Patents, Washington, D. C."